Oct. 20, 1931.    L. A. ASPINWALL    1,828,274
POTATO PLANTER
Original Filed July 27, 1926    3 Sheets-Sheet 1
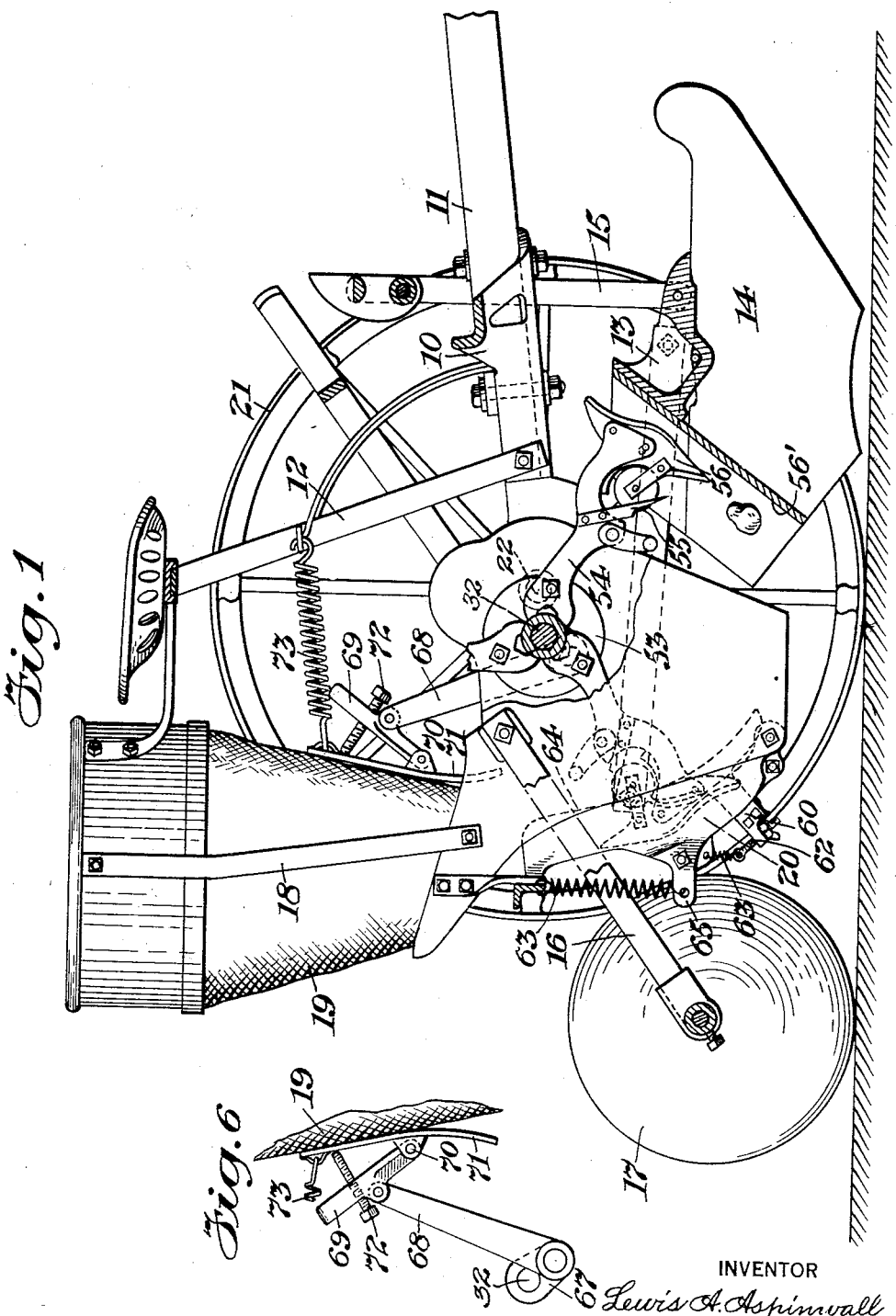
INVENTOR
Lewis A. Aspinwall
BY
Serrell Son
ATTORNEYS Oct. 20, 1931.  L. A. ASPINWALL  1,828,274
POTATO PLANTER
Original Filed July 27, 1926   3 Sheets-Sheet 2
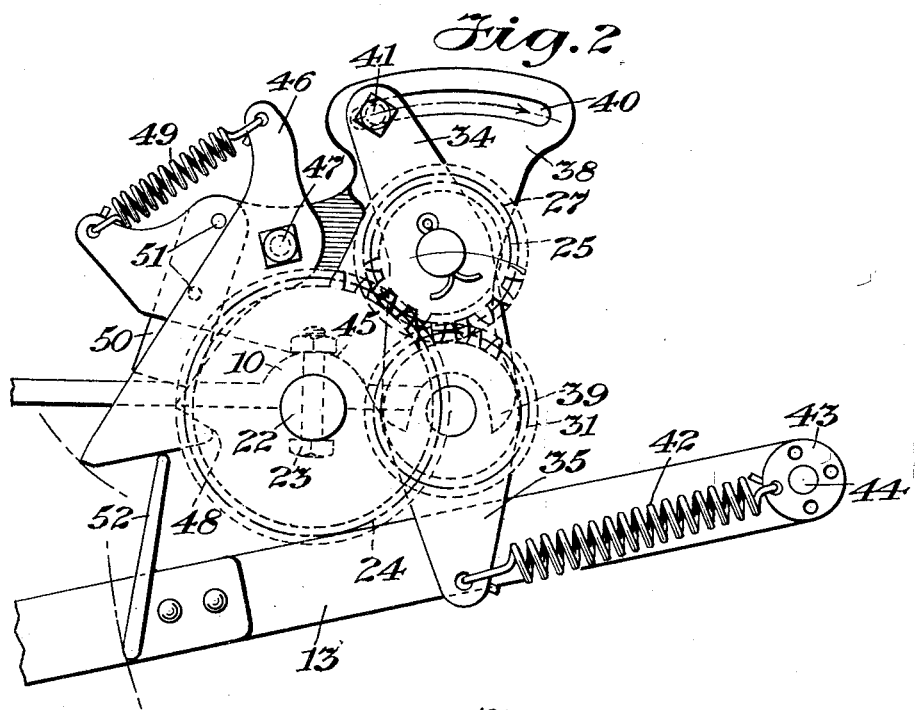
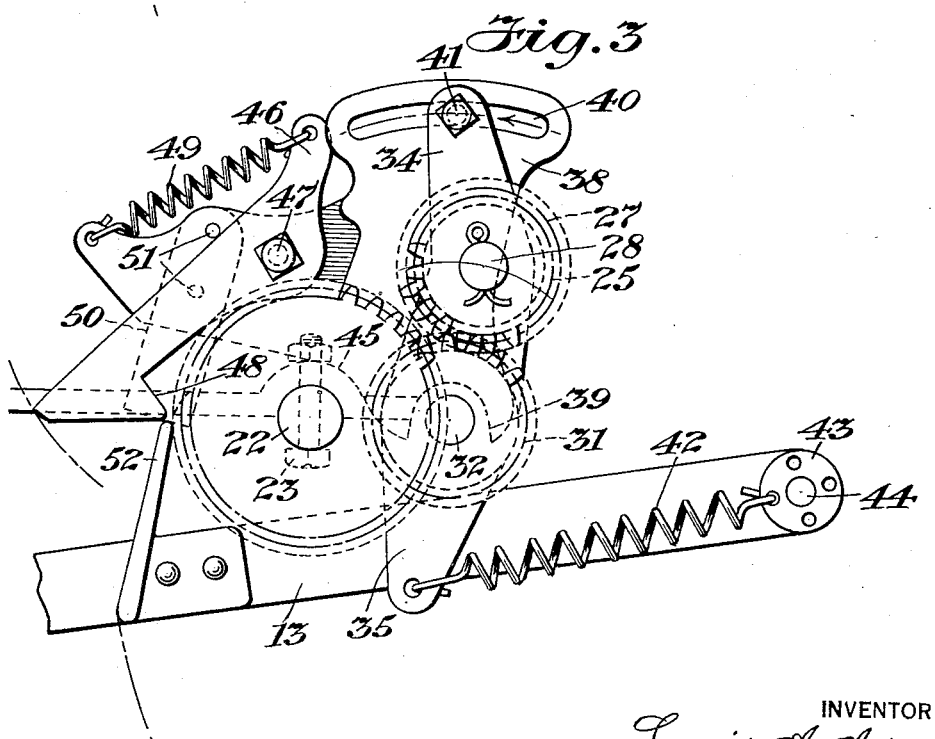
INVENTOR
Lewis A. Aspinwall
BY
HIS ATTORNEYS Oct. 20, 1931.  L. A. ASPINWALL  1,828,274
POTATO PLANTER
Original Filed July 27, 1926  3 Sheets-Sheet 3
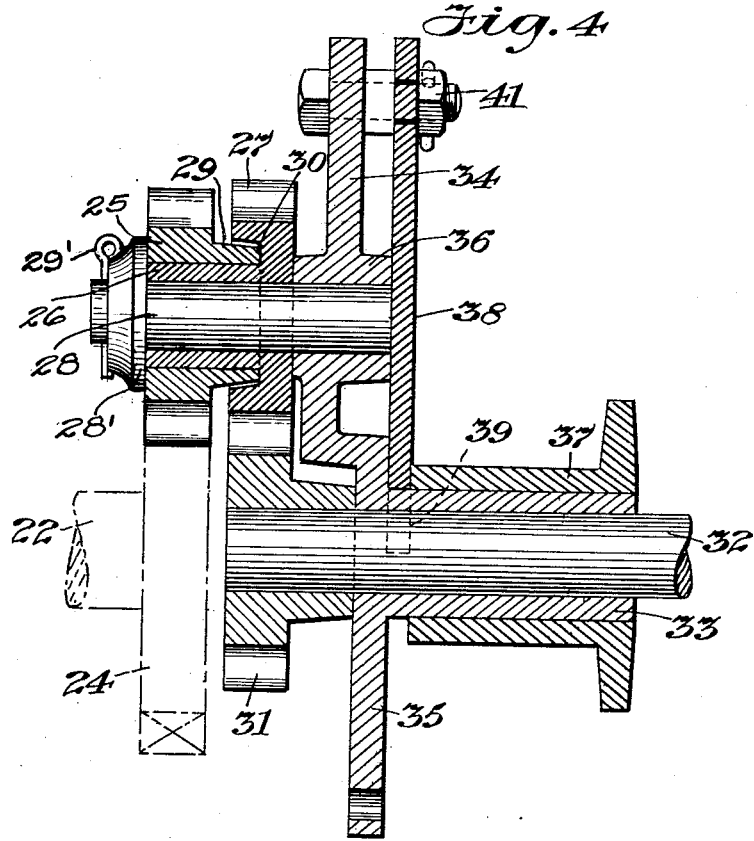
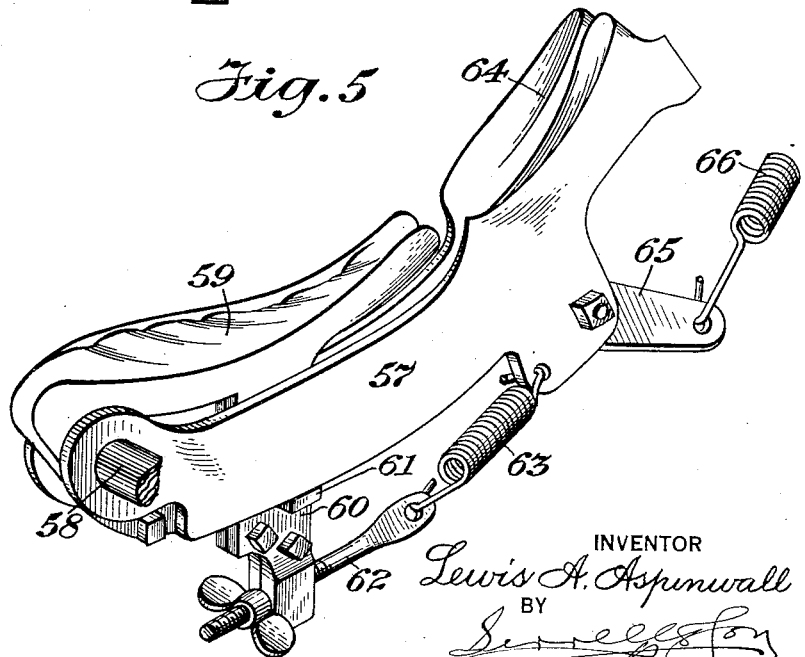
INVENTOR
Lewis A. Aspinwall
BY
HIS ATTORNEYS Patented Oct. 20, 1931

1,828,274

UNITED STATES PATENT OFFICE

LEWIS AUGUSTUS ASPINWALL, OF LA CROSSE, WISCONSIN, ASSIGNOR, BY MESNE ASSIGNMENTS, TO OLIVER FARM EQUIPMENT COMPANY, A CORPORATION OF DELAWARE

POTATO PLANTER

Application filed July 27, 1926, Serial No. 125,235. Renewed October 1, 1928.

My present invention relates to a potato planter and more particularly to improvements in the potato planter constructions as shown and described in Letters Patent No. 658,562 granted to me September 25, 1900, and Letters Patent No. 864,595 granted to me August 27, 1907, as well as in the constructions shown and described in various other Letters Patent heretofore granted to me. The invention furthermore relates especially to that part of the apparatus by which the pickers and picker arms are driven and the gates controlling the discharge of the potatoes from the hoppers are operated. In the patents to which I have referred the pickers and picker arms are actuated from a sleeve associated with the main axle in one instance, and from a counter-shaft in the other instance, and in both and in similar cases suitably constructed gears have been employed for revolving the pickers and picker arms and suitably constructed clutch devices with means for throwing the same in and out have been employed for connecting and disconnecting the pickers and picker arms to and from the gears and devices for operating the same. In these and other constructions also, it has heretofore been possible by changing sets of gear to adjust and regulate the speed at which the pickers and picker arms revolve relatively to the speed at which the planter travels in order to vary the distance between the potatoes as planted in the furrow made by the plow of the planter. In these as well as other constructions the axis of the pickers and picker arms has been coincident with or in advance of the main axle or the axle upon which the drive wheels of the planter are mounted, and because of this construction the position of the plow is so far advanced as to lie outside of the radius of the drive wheels and to more or less unbalance the planter, making a furrow of more or less irregular depth. In carrying out my invention the present improvements are such as to overcome these difficulties, and by the use of these improvements the pickers and picker arms as well as the gates controlling the discharge of the hopper are connected and disconnected to and from their operative positions in the planter by lowering and raising the plow. The gear construction by which these parts are operated is such that by the changing of a single gear, the distance between the potato seeds as laid in the furrow may be varied, the axis of the picker shaft is at the rear of the axis of the drive wheels thereby bringing the plow substantially within the radius of the drive wheels to effect a more even balance of the planter and to obtain a substantially uniform depth in the furrow as made by the plow, and because of the more even balance of the apparatus as will be understood, the weight otherwise carried by the necks of the horses in drawing the planter is largely removed.

The construction by which the advantageous features of my improved potato planter are carried out in practice will be hereinafter more particularly described in conjunction with the accompanying drawings in which Figure 1 is an elevation and partial longitudinal cross section illustrating a planter made in accordance with this invention.

Fig. 2 is an elevation illustrating the gearing and parts associated therewith for operating and controlling the movement of the pickers and picker arms and hopper gates.

Fig. 3 is a similar view showing the parts in another position.

Fig. 4 is an enlarged transverse section illustrating the arrangement of the gears.

Fig. 5 is a perspective view of the concave, and

Fig. 6 is a side elevation of the crank and lever and associated parts therewith for operating the hopper gates.

Referring to the drawings the planter in which my present invention is incorporated includes the usual conventional parts comprising a suitable frame 10 in which there is connected a draft pole 11, a seat post 12, a plow bar 13 with a plow 14 connected thereto and a lifting bar 15 for raising and lowering the plow, the coverer bars 16 in which the coverers 17 are mounted, the hopper bars 18 in which the hoppers 19 are secured, and the concaves 20 which are also suitably mounted in the frame.

In this potato planter the drive wheels are mounted on stub shafts which are suitably fixed in the frame of the apparatus. For example one drive wheel 21 is mounted on a stub shaft 22 which is secured by suitable bolts 23 in a recess provided therefor in the frame of the planter. The drive wheel is adapted to turn on the stub shaft and is secured thereon by a suitable cap or otherwise. Also mounted on the stub shaft 22 and suitably connected to the drive wheel 21 there is a drive gear 24. This drive gear 24 meshes with a pinion 25, the hub of which is constructed to fit over a portion of the hub 26 of an associated pinion 27 which is mounted on a stub shaft 28. The hub of the pinion 25 is provided with a non-circular sleeve 29 adapted to be received in a complementary socket 30 provided for this purpose in the hub of the pinion 27, these parts acting as a clutch whereby the pinion 27 is turned by and with the pinion 25. The pinions 25 and 27 are retained on the stud shaft 28 by castellated washer 28' and cotter pin 29'. The pinion 27 meshes with a gear 31 fixed on a picker shaft 32. Fitted over this picker shaft 32 there is a sleeve 33. The sleeve has oppositely disposed projecting arms 34 and 35. In the arm 34 there is a bearing 36 in which the stub shaft 28 for the pinions 25 and 27 is fixed so that the pinions are adapted to swing with the sleeve 33 upon the picker shaft 32. The sleeve 33 and the picker shaft 32 are journaled in a bearing 37 provided therefor in the frame of the planter.

In this planter I also employ an adjusting plate 38. The lower portion of this adjusting plate is forked as indicated at 39 and is adapted to fit over and rest upon the sleeve 33 between the outer end of the bearing 37 and the adjacent portion of the arm 34. In this adjusting plate 38 there is a slot 40 arranged concentrically with the axis of the picker shaft. Mounted in the arm 34 there is a bolt 41 which passes through the slot 40 and with a spacer intervening between the arm 34 and the adjusting plate 38 is adapted to secure the arm and sleeve to the adjusting plate in any desired position depending as will be understood upon the diameter of the pinion 25 which may be employed to determine the speed of the revoluble pickers and consequently the space at which the potatoes or parts thereof forming the potato seed are placed in the furrows. The sleeve 33 and the adjusting plate 38 with the parts associated therewith are normally maintained under tension which tends to swing these parts in a counter clockwise direction as indicated in Figs. 2 and 3 so as to maintain the pinion 25 in mesh with the drive gear 24 by a spring 42 which at one end is connected to the arm 35 of the sleeve 33 and at the opposite end to a disk 43 which is mounted on a pin 44 upon which the plow bar 13 is also mounted and is adapted to swing. With these parts in this position, that is with the pinion 25 in mesh with the drive gear 24 the lower side of the adjusting plate as indicated at 45 rests upon the frame immediately above that portion in which the adjacent stub axle is secured. Connected to the adjusting plate there is a latch 46. As indicated in the drawings the latch 46 is pivotally connected to the adjusting plate by a bolt 47 so as to swing relatively thereto. The latch 46 is fitted with a nose 48 adapted to be received in a recess provided therefor in the frame to maintain the adjusting plate and the parts associated therewith in position during the operation of the planter. A spring 49 is employed by being connected at one end to the latch 46 and at the other end to a portion of the adjusting plate for normally maintaining the latch in its operative position. Also secured to the adjusting plate is a strike plate 50 which may be connected thereto by means of rivets 51 or otherwise. The plow bar is provided with a throw out lever 52. When the plow and plow bar are raised from an operative to an inoperative position the upper end of the throw out lever 52 first engages the inclined end of the latch 46 and unlocks the same, swinging it on the bolt 47 against the action of the spring 49 and in the continued upward movement of the plow bar in raising the plow the end of the throw out lever 52 comes in contact with the strike plate 50 and thereby swings the adjusting plate and the parts associated therewith against the action of the spring 42 and thereby moves the pinion 25 entirely out of mesh with the drive gear 24 so as render the picker shaft and the parts actuated thereby entirely inoperative.

On the picker shaft there is a collar 53 to which the picker arms 54 are suitably connected. At the extremities of these picker arms the same are provided with picker devices each including a pair of picker points 55 for impaling a potato as the same passes through the concaves, and a liberator plate and roller 56 pivotally mounted at the end of the picker arm for freeing the potato and permitting the same to drop through the chute 56' at the rear of the plow so as to be properly conducted to the furrow.

In my improved planter I also employ a novel form of concave which is illustrated in Fig. 5 of the drawings. This concave comprises frames 57 which are suitably connected and pivotally mounted in the planter frame on a pin or bolt 58 or otherwise, and the concaves include a primary concave 59 which is also pivotally mounted on the pin 58 and fitted with an arm 60 extending between and through the frames 57 and normally maintained in position against a stop 61 carried by the arm 60 by means of an adjusting bolt 62 and a spring 63 or otherwise. In the frame members 57 there is formed a secondary concave 64 cooperating with the primary concave whereby in the event of the pickers failing to impale a potato in the primary concave they will impale a potato in the secondary concave. This concave is yieldingly maintained in position in the frame of the planter by means of an arm 65 and a spring 66. This concave construction forms no part of my present invention, and consequently will not be described in further detail.

At the end of the picker shaft 32 opposite that to which the gear 31 is fixed, there is a crank 67. A link or rod 68 is pivotally connected at one end to the crank 67 and at the opposite end to a lever 69 which by means of a rocker shaft 70 actuates the gate 71 for controlling the passage of the potatoes from the hopper 19 to the concaves. The relative positions in these parts and consequently the extent of movement of the gates may be determined by the adjusting screw 72 which passes through and is adjustable to position in the lever 69 and is adapted to contact with the gate 71. These parts are maintained in their operative relationship by means of a spring 73 or otherwise. As this crank and rod construction is at the side of the apparatus, it will be understood that it in no way interferes with the feeding of the potatoes, and consequently is an improvement over the devices heretofore employed for operating the feed gates which have consisted in eccentrics and links or similar structures employed in such a manner that they interfere more or less with the feeding of the potatoes.

The operation of the potato planter as hereinbefore described is fundamentally the equivalent of the operation of potato planters shown and described in Letters Patent to which reference has hereinbefore been made, as well as in other Letters Patent heretofore granted to me. In this operation the forward movement of the planter on the drive wheels causes the revolution of the picker shaft and pickers permitting the pickers as they revolve through the concaves to successively impale the potatoes which are removed from the pickers and successively dropped into the furrow made by the plow, which furrow is then closed by the flexible coverers. In this planter as hereinbefore described the gears employed to drive the picker shaft from the drive wheel and the drive gear associated therewith are normally maintained in their operative relationship by the action of the spring tending to maintain the parts in this relationship and the latch by which they are locked in position. In raising the plow from its operative to its inoperative position the latch is unlocked and the gears separated to render inoperative the picker shaft and the parts associated therewith including the mechanism for operating the hopper gates for feeding the potatoes therefrom. It will also be understood that in order to change the distance at which the potatoes for a given speed of the machine are dropped into the furrow it is only necessary to change a single gear, namely the intermediate pinion 25 which normally meshes with the drive gear and to adjust the sleeve and its extension to the required position relatively to the adjusting plate. Furthermore, the entire weight of the machine is carried by the stub axle, and as the picker shaft is mounted at the rear of the stub axles the plow is made to lie well within the radius of the drive wheels and provides a better balance in the planter resulting in a furrow of more uniform depth and requiring less power to operate the machine.

I claim as my invention:

1. In a potato planter, a frame, a drive gear, a picker shaft, a sleeve revolubly mounted on the picker shaft, a gear connected to the picker shaft, a stub shaft fixed in an extension of the said sleeve, a pinion mounted on the stub shaft adapted to mesh with the gear on the picker shaft, a second pinion on the stub shaft adapted to interlock with the first aforesaid pinion on the stub shaft and to mesh with the said drive gear, means for revolubly shifting the said sleeve and the extension thereof to connect and disconnect the said second pinion and drive gear and means carried by said extension and engageable with said frame for locking said second pinion and driving gear in meshing relation.

2. In a potato planter, a frame, a drive gear, a picker shaft, a sleeve revolubly mounted on the picker shaft, a bearing in the frame in which the said sleeve is journaled, a gear fixed on the picker shaft, a stub shaft fixed in an extension of the said sleeve, a pinion revoluble on the stub shaft and adapted to mesh with the gear on the picker shaft, an interchangeable pinion also mounted on the stub shaft adapted to engage and turn with the aforesaid pinion and to mesh with the drive gear, an adjusting plate, means for securing the adjusting plate to the extension of the sleeve in a position dependent upon the diameter of the interchangeable pinion, and means for shifting the sleeve and its extension and the said adjusting plate to connect and disconnect the drive gear and interchangeable pinion.

3. In a potato planter, a frame, a drive gear, a picker shaft, a sleeve revolubly mounted on the picker shaft, a bearing in the frame in which the sleeve is journaled, a gear mounted on the picker shaft, a stub shaft fixed in an extension of the said sleeve, a pinion revoluble on the stub shaft and meshing with the gear on the picker shaft, a second pinion mounted to turn with the aforesaid pinion on the stub shaft and adapted to mesh with the drive gear, an adjusting plate, means for connecting the adjusting plate to the extension of the said sleeve, and means for revolubly shifting the sleeve and its extension together with the adjusting plate to connect and disconnect the said second pinion with the drive gear.

4. In a potato planter, a frame, a drive gear, a picker shaft, a sleeve revolubly mounted on the picker shaft, a bearing in the frame in which the sleeve is journaled, a gear mounted on the picker shaft, a stub shaft fixed in an extension of the said sleeve, a pinion revoluble on the stud shaft and meshing with the gear on the picker shaft, a second pinion mounted to turn with the aforesaid pinion on the stub shaft and adapted to mesh with the drive gear, an adjusting plate, means for normally maintaining the sleeve with its extension and the said adjusting plate in position with the said second pinion in mesh with the said drive gear, and means for revolubly shifting the said sleeve with its extension and the said adjusting plate to disconnect the said second pinion from the said drive gear.

5. In a potato planter, a frame, a drive gear, a picker shaft, a sleeve revolubly mounted on the picker shaft, a bearing in the frame in which the sleeve is journaled, a gear mounted on the picker shaft, a stub shaft fixed in an extension of the said sleeve, a pinion revoluble on the stud shaft and meshing with the gear on the picker shaft, a second pinion mounted to turn with the aforesaid pinion on the stub shaft and adapted to mesh with the drive gear, an adjusting plate, means for locking the said sleeve with its extension and the said adjusting plate in the position in which the said second pinion meshes with the said drive gear and means for unlocking the sleeve with its extension and the said adjusting plate and shifting the same revolubly to disconnect the said second pinion from the said drive gear.

6. In a potato planter, a frame, a drive gear associated therewith, a picker shaft, a sleeve revolubly mounted on the picker shaft, a gear fixed to the picker shaft, a pinion carried by the sleeve and adapted to mesh with the gear on the picker shaft, a second pinion associated with the aforesaid pinion to turn therewith and adapted to mesh with the drive wheel, a plow bar, a plow, and means operative in raising the plow and plow bar for revolubly shifting the said sleeve to disconnect the said second pinion from the said drive gear.

7. In a potato planter, a frame, a drive wheel, a drive gear associated therewith, a picker shaft, a sleeve revolubly mounted on the picker shaft, a bearing in the frame in which the sleeve is journaled, a gear fixed on the picker shaft, a pinion carried by the said sleeve and meshing with the gear on the picker shaft, a second pinion associated with the aforesaid pinion to turn therewith and meshing with the drive gear, a plow bar, a plow mounted thereon, means for normally maintaining the said second pinion in mesh with the drive gear when the plow and plow bar are lowered to their operative positions, and means operative in raising the plow bar for revolubly shifting the said sleeve and pinions to disconnect the said second pinion from the said drive gear.

8. In a potato planter, a frame, a drive wheel, a drive gear associated therewith, a picker shaft, a sleeve revolubly mounted on the picker shaft, a bearing in the frame in which the sleeve is journaled, a gear fixed on the picker shaft, a pinion associated with the sleeve and adapted to mesh with the gear on the picker shaft, a second pinion associated with the aforesaid pinion to turn therewith and adapted to mesh with the drive gear, a plow bar, a plow mounted thereon, means when the plow bar and plow are in their lowered operative positions for normally maintaining the said second pinion in mesh with the drive gear, means for locking the sleeve in the position in which the said second pinion is in mesh with the drive gear, and means operative in raising the plow and plow bar for unlocking the said sleeve and revolubly shifting the same to disconnect the said second pinion from the said drive gear.

9. In a potato planter, a frame, a drive wheel, a drive gear associated with the drive wheel, a picker shaft, a sleeve revolubly mounted on the picker shaft, a bearing in the frame in which the said sleeve is journaled, a gear fixed on the picker shaft, a pinion carried by an extension of the said sleeve and meshing with the gear on the picker shaft, a second pinion associated with the aforesaid pinion to turn therewith and meshing with the drive gear, an adjusting plate, means for connecting the adjusting plate to the extension of the said sleeve, a plow bar, a plow, means for maintaining the said second pinion in mesh with the drive gear when the plow and plow bar are lowered to their operative positions, devices for locking the sleeve and its extension together with the adjusting plate in position with the said second pinion meshing with the said drive gear, and means operative in raising the plow and plow bar for unlocking the said sleeve with its extension and adjusting plate and revolubly shifting the same to disconnect the said second pinion from the said drive gear.

10. In a potato planter, a frame, a drive wheel, a drive gear associated with the drive wheel, a picker shaft, a sleeve revolubly mounted on the picker shaft, a bearing in the frame in which the said sleeve is journaled, a gear fixed on the picker shaft, a pinion carried by an extension of the said sleeve and meshing with the gear on the picker shaft, a second pinion associated with the aforesaid pinion to turn therewith and meshing with the drive gear, an adjusting plate at one end fitting over the said sleeve and having a portion adapted to rest on the said frame, means for connecting the adjusting plate to the extension of the said sleeve, a plow bar, a plow mounted thereon, means when the plow bar and plow are lowered to their operative positions for maintaining the said second pinion in mesh with the drive gear, a spring actuated latch pivotally mounted on the adjusting plate and adapted to engage the said frame to lock the said adjusting plate, the sleeve and the extension thereof in the position in which the said second pinion meshes with the drive gear, a strike plate secured to the said adjusting plate, and a throw out bar connected to the plow bar and adapted in raising the plow and plow bar to release the latch and to come into contact with the strike plate to revolubly shift the adjusting plate and the said sleeve and its extension to disconnect the said second pinion from the said drive gear.

11. In a potato planter, a frame, a drive wheel, a stub axle secured in the frame and upon which the drive wheel is mounted, a drive gear associated with the drive wheel, a picker shaft, a sleeve revolubly mounted on the picker shaft, a bearing in the frame in which the said sleeve is journaled, a gear fixed on the picker shaft, a pinion carried by an extension of the said sleeve and meshing with the gear on the picker shaft, a second pinion associated with the aforesaid pinion to turn therewith and meshing with the drive gear, an adjusting plate adapted at one end to bear against the said sleeve between the said bearing and the adjacent portion of the extension of the sleeve and also to bear against the said frame above the stub axle on which the drive wheel is mounted, means for connecting the said adjusting plate in one of a plurality of positions to the extension of the said sleeve, a plow bar, a plow mounted thereon, means when the plow bar and plow are lowered to their operative positions for yieldingly maintaining the said second pinion in mesh with the drive gear, a spring actuated latch pivotally connected to the adjusting plate and adapted to lock the adjusting plate and the sleeve with its extension in the position in which the said second pinion meshes with the drive gear, a strike plate secured to the adjusting plate, and a throw out bar connected to the said plow bar and adapted in the upward movement of the plow bar and plow to release the latch and contact with the strike plate to revolubly shift the adjusting plate and the sleeve and its extension to disconnect the said second pinion from the said drive gear.

12. In a potato planter the combination of a frame, a drive gear journaled on said frame, a picker shaft, a driven member for rotating said picker shaft, driving means operatively connected with said driven member and rotatable on an axis parallel therewith, a movable plate carried by said frame, a pinion mounted on said plate, and arranged to rotate with said driving means and adapted to engage said drive gear, and means carried by said plate and engageable with said frame for locking said pinion and drive gear in meshing relation.

13. In a potato planter the combination of a frame, a drive gear journaled in the frame, a picker shaft, a driven member for rotating said picker shaft, driving means operatively connected with said driven member and rotatable on an axis parallel therewith, a pinion arranged to rotate with said driving means and adapted to engage said drive gear, means for yieldingly urging said pinion and driving gear into mesh and means for automatically locking said pinion and driving gear in meshing relation.

14. In a potato planter the combination of a frame, a drive gear journaled in the frame, a picker shaft, a driven member for rotating said picker shaft, driving means operatively connected with said driven member and rotatable on an axis parallel therewith, a pinion arranged to rotate with said driving means and adapted to engage said drive gear, means for locking said pinion in driving engagement with said drive gear, and means for releasing said locking means.

15. In a potato planter the combination of a frame, a drive gear journaled in the frame, a picker shaft, a driven member for rotating said picker shaft, driving means operatively connected with said driven member and rotatable on an axis parallel therewith, a pinion arranged to rotate with said driving means and adapted to engage said drive gear, yielding means for causing relative movement and engagement of said pinion and drive gear, means for locking said gear and pinion in driving engagement and means for releasing said locking means and overcoming the force of said yielding means.

16. In a potato planter the combination of a frame, a drive gear journaled in the frame, a picker shaft, a driven member for rotating said picker shaft, driving means operatively connected with said driven member and rotatable on an axis parallel therewith, a pinion arranged to rotate with said driving means and adapted to engage said drive gear, yielding means for causing relative movement and engagement of said pinion and drive gear, means for adjusting and limiting the extent of said movement to accommodate pinions of a plurality of sizes, and means adapted to overcome the force of said yielding means.

17. In a potato planter the combination of a frame, a drive gear journaled in the frame, a picker shaft, a driven member for rotating said picker shaft, driving means operatively connected with said driven member and rotatable on an axis parallel therewith, a pinion arranged to rotate with said driving means and adapted to engage said drive gear, yielding means for causing relative movement and engagement of said pinion and drive gear, means for adjusting and limiting the extent of said movement to accommodate pinions of a plurality of sizes, locking means on said adjusting means for locking said gear and pinion in driving engagement, and a trip member for releasing said locking means and disengaging said gear and pinion from driving relation.

18. In a potato planter the combination of a frame, a picker shaft, a gear for said shaft, a drive gear, two pinions mounted for oscillation about said shaft as an axis and arranged to rotate as a unit, one of said pinions meshing with the picker shaft gear, the other pinion being adapted to engage said drive gear, yielding means for maintaining said other pinion in mesh with said drive gear and means for overcoming the force of said yielding means.

19. In a potato planter the combination of a frame, a drive gear, a picker shaft, a picker shaft gear, an interchangeable pinion arranged to be moved into and out of mesh with said drive gear, a second pinion mounted for rotation with said interchangeable pinion and meshing with said picker shaft gear, means for normally maintaining said interchangeable pinion in mesh with said drive gear, and means for moving said interchangeable pinion out of mesh with said drive gear.

20. In a potato planter the combination of a frame, a drive gear journaled in the frame, a picker shaft, a driven member for rotating said picker shaft, driving means operatively connected with said driven member and rotatable on an axis parallel therewith, an interchangeable pinion interlocking said driving means for rotation therewith and adapted to engage said drive gear, supporting means for said pinion adapted for pivotal movement about said picker shaft, automatically operable mechanism for oscillating said supporting means and for engaging and disengaging said pinion and drive gear.

21. In a potato planter the combination of a frame, a drive gear journaled in the frame, a picker shaft, a driven member for rotating said picker shaft, driving means operatively connected with said driven member and rotatable on an axis parallel therewith, an interchangeable pinion interlocking said driving means for rotation therewith, and adapted to engage said drive gear, supporting means for said pinion adapted for pivotal movement about said picker shaft, means for causing oscillatory movement of said pinion supporting means and engagement of said pinion and drive gear, a plow bar and means operative in raising said plow bar for disengaging said pinion and drive gear.

Signed by me this 21st day of July, 1926.
LEWIS AUGUSTUS ASPINWALL.